United States Patent [19]

Kienle et al.

[11] 4,356,066

[45] Oct. 26, 1982

[54] PROCESS FOR FABRICATING A MULTI-LAYER MAGNETIC THIN FILM DISK

[75] Inventors: Helmut Kienle, Boeblingen; Gerhard E. Schmid, Stetten; Werner Steiner, Boeblingen; Gerhard Trippel, Sindelfingen, all of Fed. Rep. of Germany

[73] Assignee: International Business Machines Corporation, Armonk, N.Y.

[21] Appl. No.: 248,141

[22] Filed: Mar. 30, 1981

[30] Foreign Application Priority Data

Apr. 17, 1980 [DE] Fed. Rep. of Germany ....... 3014718

[51] Int. Cl.$^3$ .......................... G11B 5/66; G11B 5/84; C25D 11/04
[52] U.S. Cl. ................. 204/38 A; 204/38 E; 427/129; 427/131; 428/64; 428/693; 428/900
[58] Field of Search ............................ 204/38 A, 38 E; 427/129, 131; 428/64, 65, 693, 900

[56] References Cited

U.S. PATENT DOCUMENTS 3,721,613  3/1973  Wilhelm et al. ..................... 204/29
3,775,266 11/1973  Ikeda et al. ........................ 204/38 E
3,886,052  5/1975  Smith ................................. 204/33
4,074,016  2/1978  Trippel ............................... 428/626

FOREIGN PATENT DOCUMENTS 2451232  6/1976  Fed. Rep. of Germany ...... 427/129
47-22076  6/1972  Japan .................................. 427/131

OTHER PUBLICATIONS

H. R. Fleck, Method of Coating Magnetic Disks, *IBM Tech. Disc. Bulletin*, vol. 12, No. 4, Sep. 1969, pp. 601.
E. Bassous et al., Protective Coating For a Magnetic Disc, *IBM Tech. Disc. Bulletin*, vol. 17, No. 1, Jun. 1974, pp. 283.

*Primary Examiner*—Delbert E. Gantz
*Assistant Examiner*—William Leader
*Attorney, Agent, or Firm*—Walter J. Madden, Jr.

[57] ABSTRACT

Multi-layer magnetic thin film disks comprising a synthetic resin layer on an aluminum-containing substrate and an overlying metallic magnetic layer, are liable to have pin holes in the synthetic resin layer caused by galvanic corrosion of the aluminum in the substrate. The pin holes are passivated by aluminum oxide produced therein by anodically oxidizing the aluminum of the substrate in an electrolytic bath, the electric voltage of which is well below the normal passivation voltage for aluminum.

5 Claims, 2 Drawing Figures

PROCESS FOR FABRICATING A MULTI-LAYER MAGNETIC THIN FILM DISK

TECHNICAL FIELD

The invention is directed to a process for fabricating a multi-layer magnetic thin film disk with a synthetic resin layer.

BACKGROUND ART

U.S. Pat. No. 4,074,016 shows a multi-layer magnetic thin film disk, the substrate of which is made of an alloy containing aluminum, namely an aluminum magnesium alloy AlMg$_5$. A thin synthetic resin layer is arranged on this substrate, followed by a thin metal layer and the magnetic recording layer. A number of tests have proved that it is not possible for the synthetic resin layer to be produced continuously and without pin holes. As a result, the electrochemical series in a corrosive atmosphere, as is present in most cases, leads to galvanic corrosion between the metal layer(s) arranged on the synthetic resin layer, and the substrate containing aluminum. This galvanic corrosion between the aluminum and the metallic thin film materials at the pin holes of the films causes what is known as blisters. Because of the pin holes in the synthetic layer, the metal layer(s) arranged thereon, and the magnetic recording layer, contain imperfections which are disadvantageous and unacceptable for the satisfactory recording of the data. In addition, the blisters lead to further disadvantageous soiling.

THE INVENTION

It is the object of the present invention to provide a process for manufacturing a thin film disk in which the pin holes existing in the synthetic layer are prevented from adversely affecting the magnetic layer, thus permitting the manufacture of a substrate which is essentially free from pin holes and on to which metallic magnetic thin films may be applied.

In accordance with the invention, the pin holes in the synthetic resin layer are passivated by aluminum oxide produced therein. Passivation of the aluminum of the substrate in the area of the pin holes in the synthetic layer by means of aluminum oxide produced therein prevents the occurrence of galvanic corrosion between the metallic thin film layers and the aluminum of the substrate. The production process employed, which is not particularly elaborate or expensive, ensures that aluminum oxide is formed on the substrate in the existing pin hole areas. Oxidation of the aluminum contained in the substrate is affected at the very points where the electrolyte contacts the aluminum substrate.

The arrangement and the method in accordance with the invention ensure the production of a substrate to which thin film materials for the production of magnetic thin film disks may be applied, so that the substrate thus obtained, which serves as a substrate for the magnetic recording layer, is essentially free from pin holes.

BRIEF DESCRIPTION OF THE DRAWINGS

The invention will be described in detail below by way of an embodiment shown in the accompanying drawings, of which.

BEST MODE EMBODIMENT AND INDUSTRIAL APPLICABILITY

Figure 1:
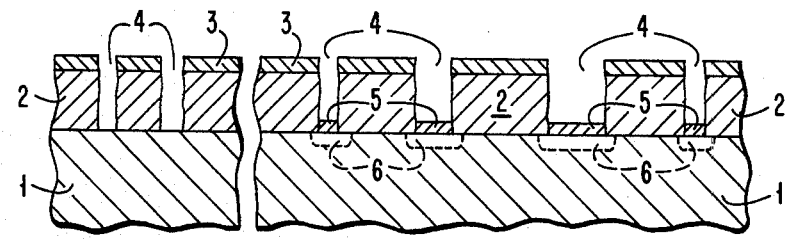
FIG. 1 is a schematic sectional view of a part of a magnetic disk containing passivated and non-passivated pin holes.

The left half of FIG. 1 shows a substrate designated as 1, which may consist of an alloy containing aluminum, such as the usually employed AlMg$_5$, aluminum magnesium alloy. A synthetic resin layer designated as 2, which may consist, for example, of epoxy resin, is applied to this substrate. Layer 2 is followed by one or several metal layers 3 which are manufactured in thin film technology, and which may also include the magnetic record carrier or the magnetic record layer. The epoxy resin layer 2 has pin holes 4 through which layer 3, upon its application, is interrupted at the very points of pin holes 4. In corrosive atmospheres, which are generally present, galvanic corrosion occurs through pin holes 4 between the metal of layer 3 and the aluminum of substrate 1. This is attributable to the fact that, as a result of the distance in the electrochemical series, there is a high electrochemical potential between the metal or metals of layer 3 and the aluminum of substrate 1. In addition to openings in the pin holes, which are disadvantageous as such, there is also the risk of unacceptable blisters occurring in them.

The right half of FIG. 1, which is in principle identical with the left half, shows a substrate 1 which also consists, for example, of AlMg$_5$, as well as a synthetic layer 2 and a metallic layer 3 which may comprise several metallic layers with or without the magnetic substrate. In this case too, pin holes 4 are present in the synthetic layer 2. In accordance with the passivation technique of the present invention, aluminum oxide 5, marked by hatched lines, is produced at the base of pin holes 4. This aluminum oxide, as marked by the broken lines 6, accumulates also in the vicinity of the pin holes 4 in substrate 1 containing aluminum. This aluminum oxide 5 in pin holes 4 electrically insulates substrate 1 against the surrounding atmosphere, so that galvanic corrosion is prevented from occurring through pin holes 4 between layer 3 or parts thereof and substrate 1. It will be understood that the relative size of the openings in magnetic layer 3 is exaggerated in FIG. 1 for illustrative purposes. In actuality, these holes are relatively small and have no noticeable effect on the magnetic properties of layer 3.

The inventive method for applying the aluminum oxide 5 in pin holes 4 for passivating and electrically insulating substrate 1, provides for substrate 1 covered with layer 2 to be placed in an electrolytic bath for anodic oxidation. During this process, an oxide layer is formed at the very point where the electrolyte electrically contacts the aluminum of substrate 1.

Figure 2:
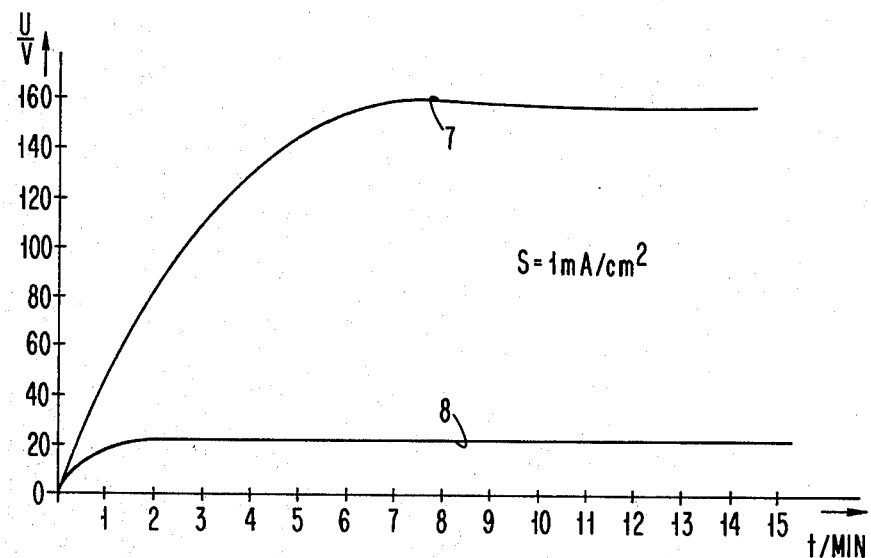
FIG. 2 shows the voltage of the passivating electrolytic bath at a constant current density for uncoated AlMg$_5$ and a synthetic resin-coated substrate material as a function of time.

As may be seen from FIG. 2, there is the problem that the voltages necessary for forming the oxide generally range from 80 to about 150 volts in the case of aluminum. Curve 7 in the diagram applies to AlMg$_5$ and shows that the passivation voltage of about 150 volts is reached after a bath period of about 8 to 10 minutes, provided that the current density S is kept constant at a value of 1 mA/cm$^2$. Thus, a constant voltage occurs after a particular period of time has elapsed in the electrolytic bath at a constant current density S. This shows that the oxidation process changing the resistance is completed, i.e., there will be no further increase in resistance.

The main problem to overcome is that an electric field strength of about $10^5$ to $10^6$ V/cm is reached at the usual thickness of 1 μm of the epoxy resin layer 2. This field strength considerably exceeds the breakdown strength of the synthetic material. In spite of this problem, tests in accordance with the invention were carried out. Curve 8 in FIG. 2 applies to epoxy resin coated substrate material, i.e., AlMg$_5$. The curve shows that a passivation voltage of about 20 volts is reached after a relatively short time. Since in accordance with curve 7, voltages of about 80 to 150 volts have been considered necessary for oxidizing AlMg$_5$ to passivate aluminum by the anodic formation of aluminum oxide, the growth of anodic oxidation at the pin holes of an about 1 μm thick epoxy resin layer at a voltage of 20 volts would not be expected.

However, samples of AlMg$_5$ substrates 1 with synthetic resin layers 2 were placed in an electrolytic bath, and anodization in accordance with curve 8 in FIG. 2 were effected. Subsequent corrosion tests showed surprisingly that the anodically treated samples had a considerably improved corrosion resistance. The reason why aluminum oxide formed in pin holes 4 at the low voltages of curve 8 of FIG. 2 is not totally understood, although the corrosion resistance of the resultant product clearly indicates that such oxide is formed.

For the experimental tests carried out in accordance with curve 8 of FIG. 2, so-called particulate magnetic disks were used, especially those which are generally referred to as rejects, because they have too many pin holes in the synthetic layer 2. In addition to synthetic binder material present in these particulate disks, layer 2 also contains magnetic material, such as $\gamma Fe_2O_3$ particles. The anodic oxidation and the formation of the aluminum oxide passivation layers 5 in pin holes 4 render such disks particularly suitable as the basic material for the production of magnetic thin film disks.

During the anodic oxidation occurring when carrying out the method of this invention, substrate 1 with synthetic resin layer 2 is subjected in the electrolytic bath to voltages considerably exceeding the breakdown voltage of the synthetic resin layer 2. The induction period of the electrolytic bath ranges from 2 to 20 minutes, preferably being about 10 minutes, while the temperature of the electrolytic bath ranges from 20° to 80° C., preferably ranging from 20° to 30° C. The electrolytic bath contains the usual substances, such as in particular ammonium pentaborate and oxalic acid as well as boric acid or tartaric acid. The thickness of the aluminum oxide layer 5 in produced pin holes 4 is up to about 0.1 μm.

We claim:

1. A method for producing a multi-layer thin film magnetic disk on an aluminum-containing substrate comprising the steps of
   depositing on said substrate a synthetic resin layer, said resin layer having a plurality of pin holes therein which expose said substrate;
   passivating said aluminum in said substrate in the areas exposed by said pin holes to produce an aluminum oxide layer so that said substrate is no longer exposed through said substrate; and
   depositing a metallic magnetic layer on said resin layer.

2. A method of manufacturing a magnetic thin film disk in accordance with claim 1, characterized in
   that passivation of said aluminum in said substrate is effected by anodically oxidizing the aluminum.

3. A method in accordance with claim 2, characterized in
   that said substrate provided with said synthetic resin layer is subjected in an electrolytic bath to an electric voltage up to 20 volts.

4. A method in accordance with claim 3, characterized in
   that the duration of anodization in said electrolytic bath is between 2 and 20 minutes, and the temperature of said electrolytic bath is up to 80° C.

5. A method in accordance with claim 3, characterized in
   that said electrolytic bath contains ammonium pentaborate, oxalic acid, boric acid or tartaric acid.

* * * * *